(12) United States Patent
Olaru

(10) Patent No.: US 10,259,152 B2
(45) Date of Patent: Apr. 16, 2019

(54) INJECTION MOLDING APPARATUS WITH HEATED MOLD CAVITIES

(71) Applicant: Otto Männer Innovation GmbH, Bahlingen am Kaiserstuhl (DE)

(72) Inventor: Gheorghe (George) Olaru, Freiburg (DE)

(73) Assignee: OTTO MÄNNER INNOVATION GMBH, Bahlingen (DE)

(*) Notice: Subject to any disclaimer, the term of this patent is extended or adjusted under 35 U.S.C. 154(b) by 628 days.

(21) Appl. No.: 14/967,170

(22) Filed: Dec. 11, 2015

(65) Prior Publication Data

US 2016/0185021 A1     Jun. 30, 2016

Related U.S. Application Data

(60) Provisional application No. 62/090,765, filed on Dec. 11, 2014.

(51) Int. Cl.
| | | |
|---|---|---|
| *B29C 45/27* | (2006.01) | |
| *B29C 45/78* | (2006.01) | |
| *B29C 45/73* | (2006.01) | |

(52) U.S. Cl.
CPC ......... *B29C 45/2738* (2013.01); *B29C 45/73* (2013.01); *B29C 45/78* (2013.01); *B29C 2045/274* (2013.01); *B29C 2045/2745* (2013.01); *B29C 2045/2748* (2013.01); *B29C 2045/7343* (2013.01); *B29C 2945/7604* (2013.01); *B29C 2945/76257* (2013.01); *B29C 2945/76381* (2013.01); *B29C 2945/76454* (2013.01); *B29C 2945/76531* (2013.01); *B29C 2945/76658* (2013.01); *B29C 2945/76735* (2013.01); *B29C 2945/76859* (2013.01)

(58) Field of Classification Search
CPC ................................................. B29C 45/2738
See application file for complete search history.

(56) References Cited

U.S. PATENT DOCUMENTS

| | | | |
|---|---|---|---|
| 4,496,131 A | 1/1985 | Yang | |
| 5,007,818 A | 4/1991 | Barancik et al. | |
| 5,973,296 A | 10/1999 | Juliano et al. | |

(Continued)

FOREIGN PATENT DOCUMENTS

| | | |
|---|---|---|
| CN | 1694792 A | 11/2005 |
| DE | 102010018590 A1 | 10/2011 |

(Continued)

OTHER PUBLICATIONS

First Office Action for Chinese Patent Application No. 201511035922.7.

(Continued)

*Primary Examiner* — Larry W Thrower
(74) *Attorney, Agent, or Firm* — Slayden Grubert Beard PLLC

(57) ABSTRACT

An injection molding apparatus and an method for the manufacture of moldable articles having an injection manifold, a plurality of hot runner nozzles, a first nozzle heater, a plurality of mold cavities positioned to receive molten material from the plurality of the hot runner nozzles, each mold cavity having at least one mold gate orifice and a mold cavity heater surrounding each mold cavity at least partially and a thermocouple associated with the mold cavity to measure directly or indirectly a temperature generated by the mold cavity heater.

12 Claims, 18 Drawing Sheets

(56) References Cited

U.S. PATENT DOCUMENTS

| | | |
|---|---|---|
| 6,305,923 B1 | 10/2001 | Godwin et al. |
| 7,290,591 B1 | 11/2007 | Chen et al. |
| 7,569,799 B2 | 8/2009 | Gunther et al. |
| 7,597,827 B2 | 10/2009 | Frey |
| 7,682,535 B2 | 3/2010 | Frey |
| 7,931,837 B2 | 4/2011 | Bader |
| 8,597,018 B2 | 12/2013 | Oh |
| 8,663,537 B2 | 3/2014 | Stensvad et al. |
| 8,770,968 B2 | 7/2014 | Mourou et al. |
| 2004/0109916 A1 | 6/2004 | Babin |
| 2008/0279978 A1* | 11/2008 | Babin ............... B29C 45/2725 425/549 |
| 2014/0367886 A1 | 12/2014 | Jaederberg |
| 2015/0054199 A1 | 2/2015 | Guenther et al. |

FOREIGN PATENT DOCUMENTS

| | | |
|---|---|---|
| EP | 0491300 A2 | 6/1992 |
| JP | H11-227003 A | 8/1999 |
| JP | 2003-205539 A | 7/2003 |
| JP | 2007-021502 A | 2/2007 |
| JP | 2007-144662 A | 6/2007 |
| JP | 2014-136365 A | 7/2014 |
| WO | 200804112 A2 | 4/2008 |

OTHER PUBLICATIONS

Article "Optimization of the Variotherm Injection Molding Process", dated Feb. 22, 2011, obtained from http://www.kunststoffe.de/en/specialized-information/technology-report/artikel/optimization-of-the-variotherm-injection-molding-process-629856.html.

Search result from search relating to WO2013152976 (A3), conducted on Espacenet database of the European Patent Office, dated Dec. 17, 2015.

Search result from search relating to WO2008041122 (A2), conducted on Espacenet database of the European Patent Office, dated Dec. 17, 2015.

Brochure "VARIOTHERM", Hofmann Werkzeugbau, dated Oct. 4, 2007.

\* cited by examiner

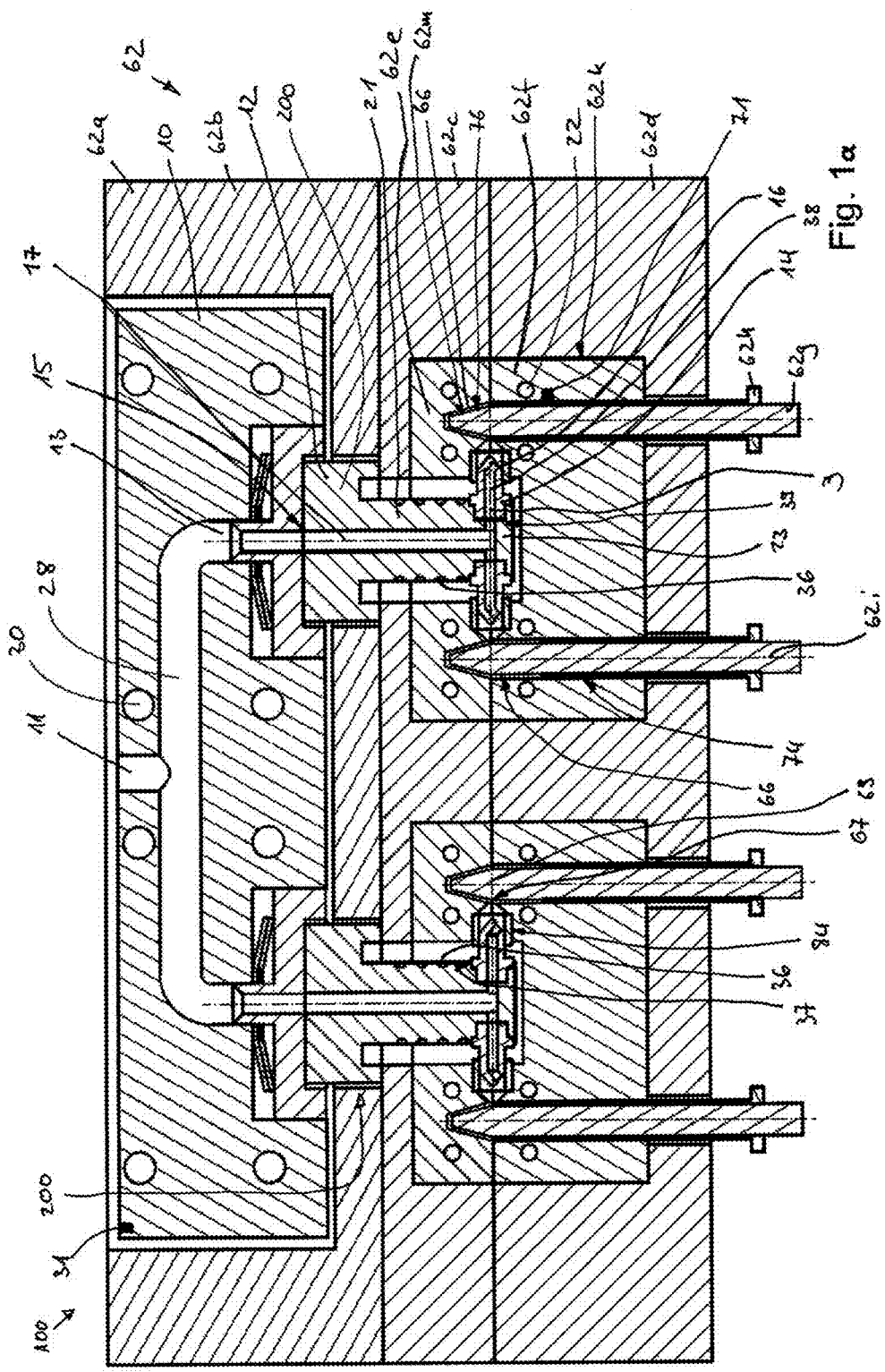

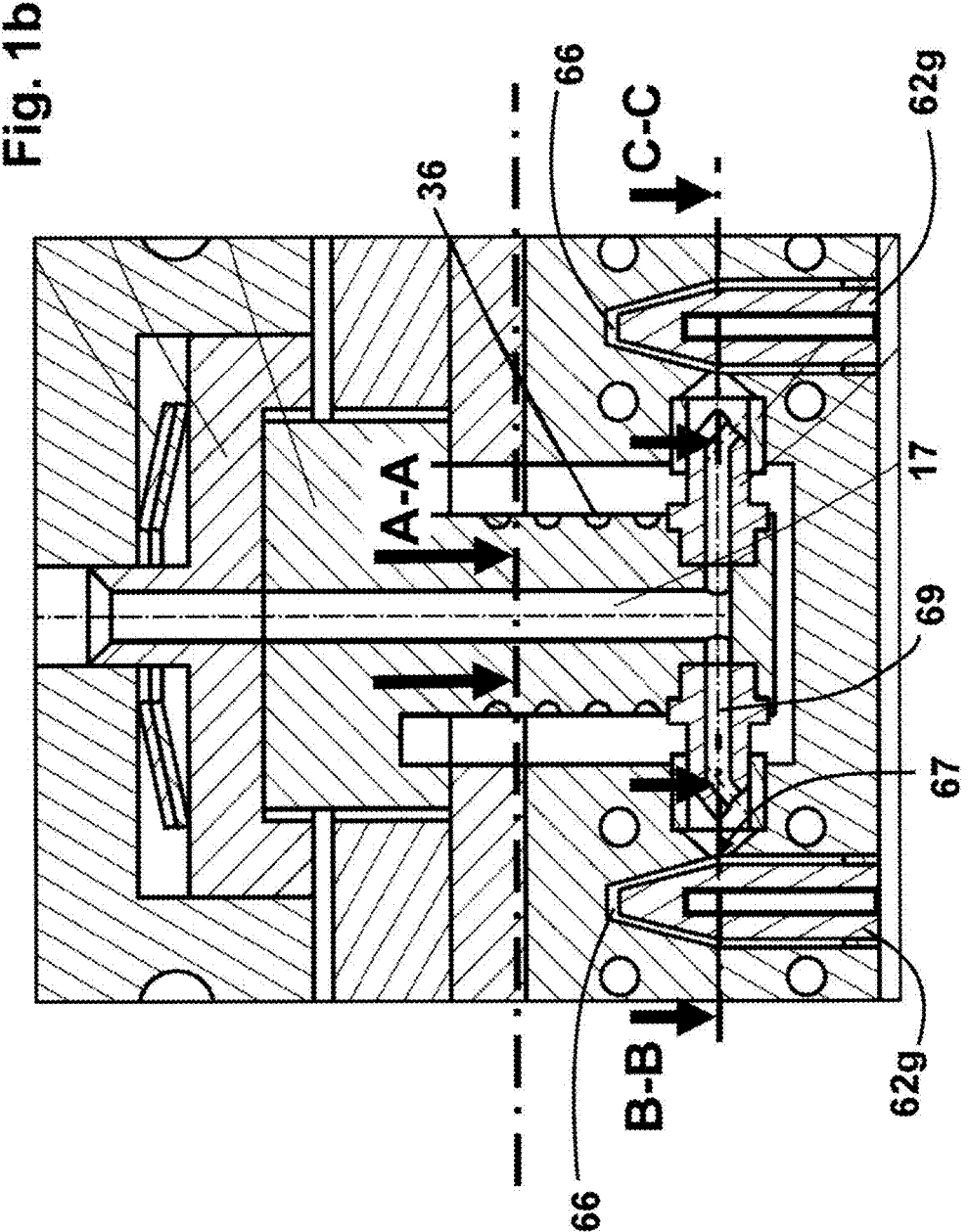

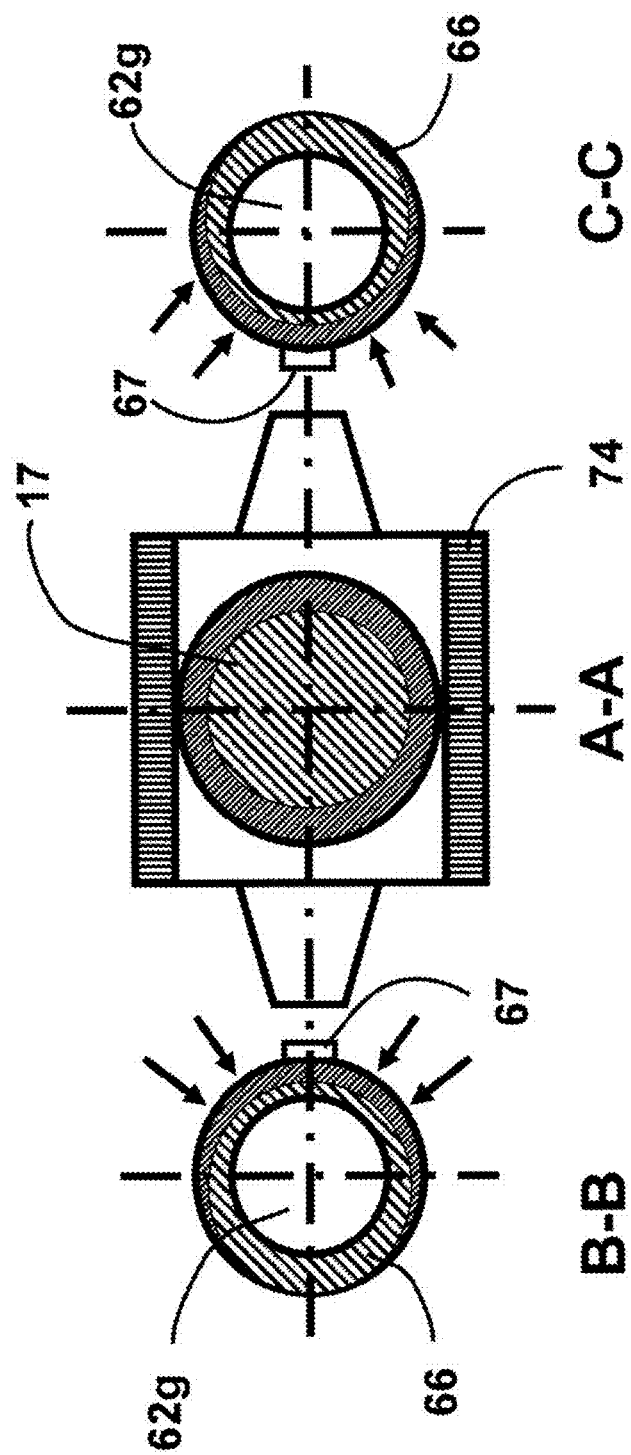

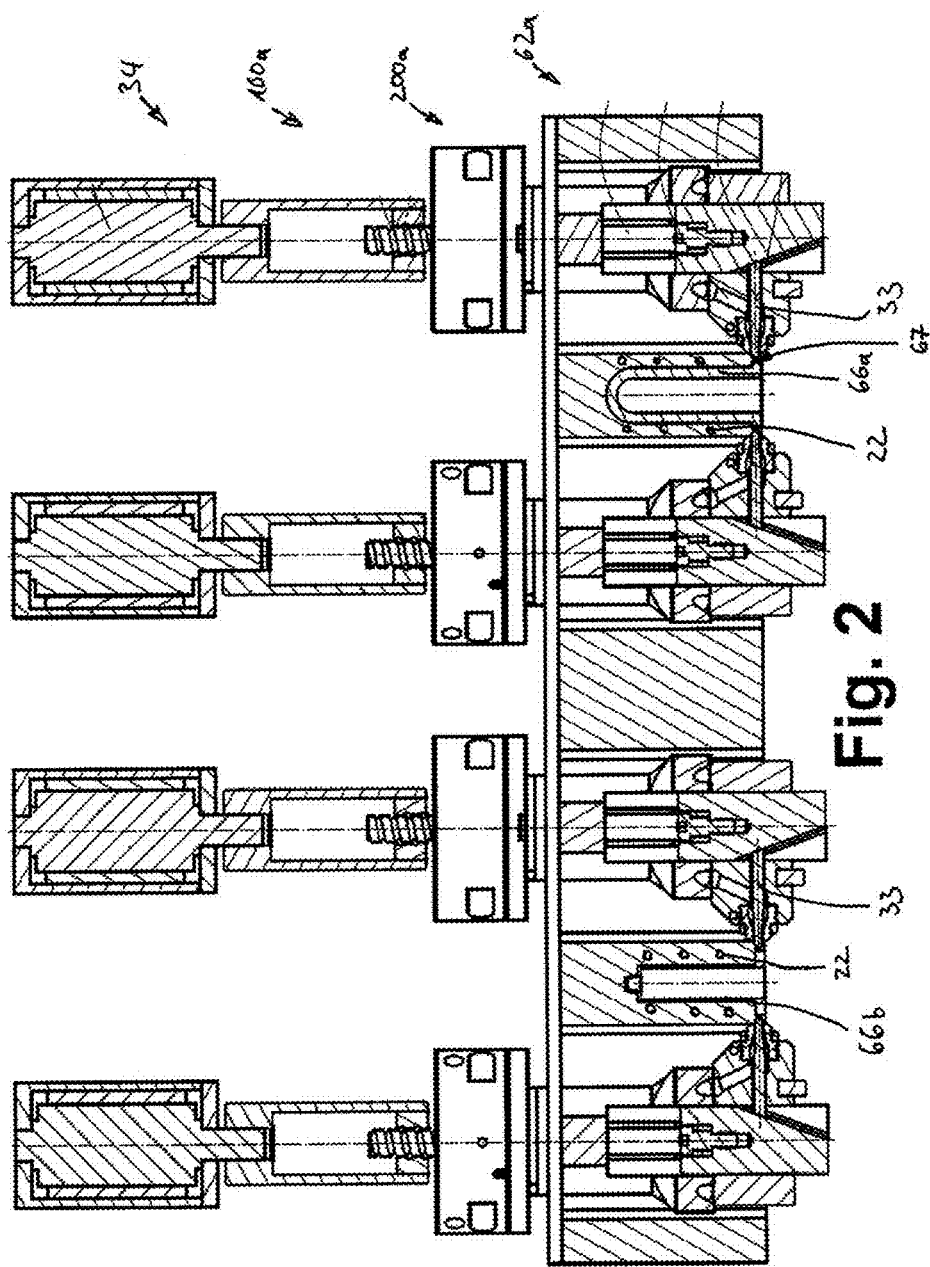

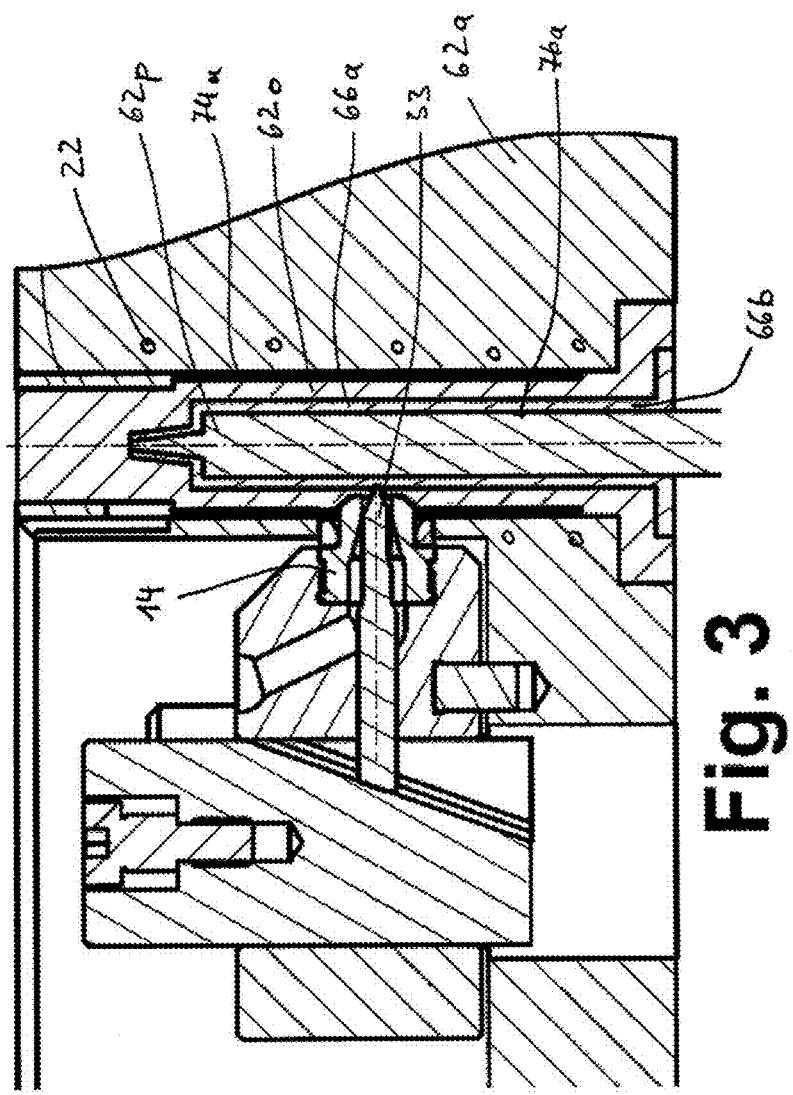

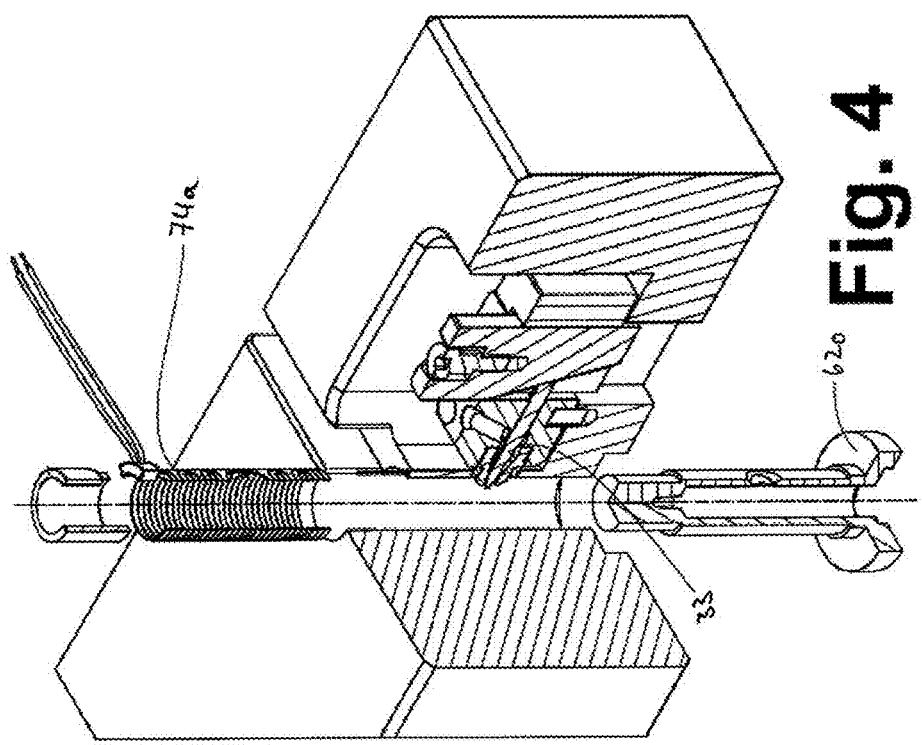

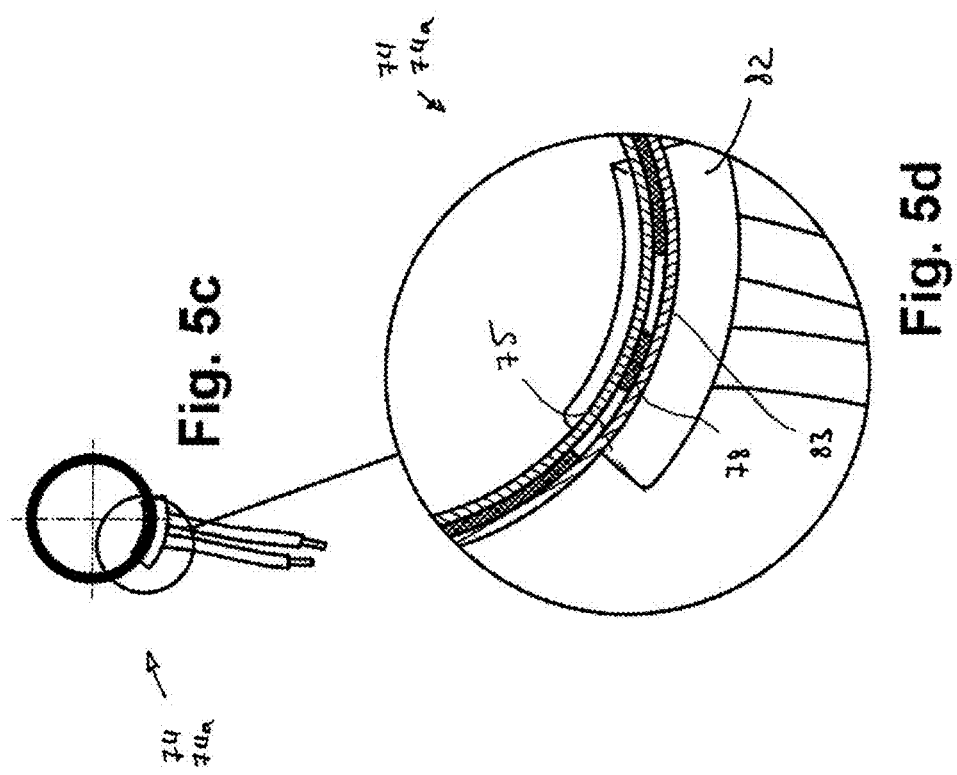

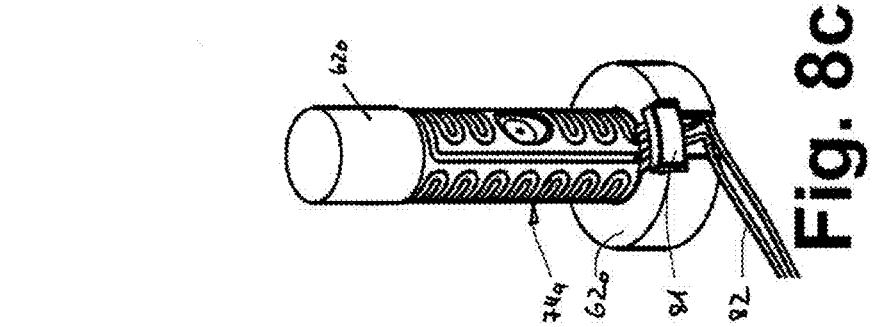
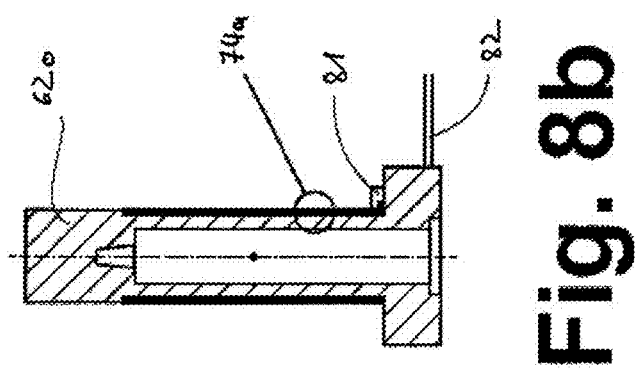
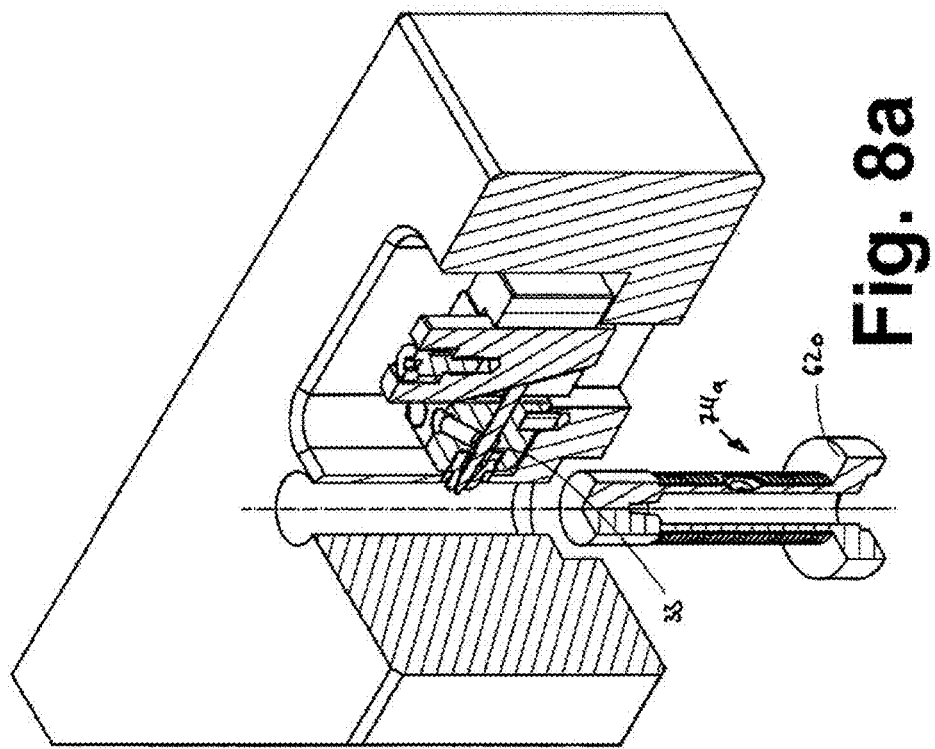

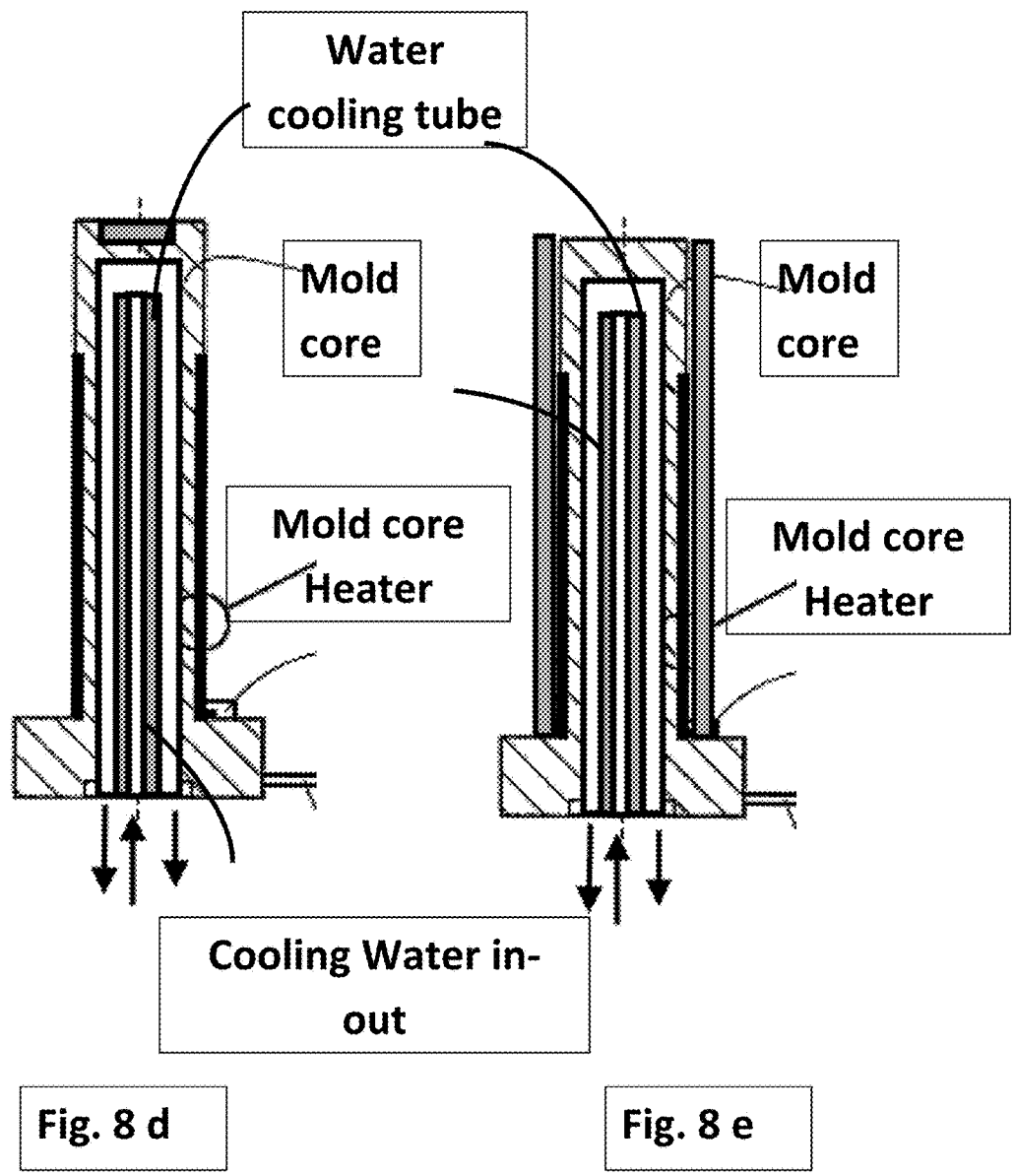

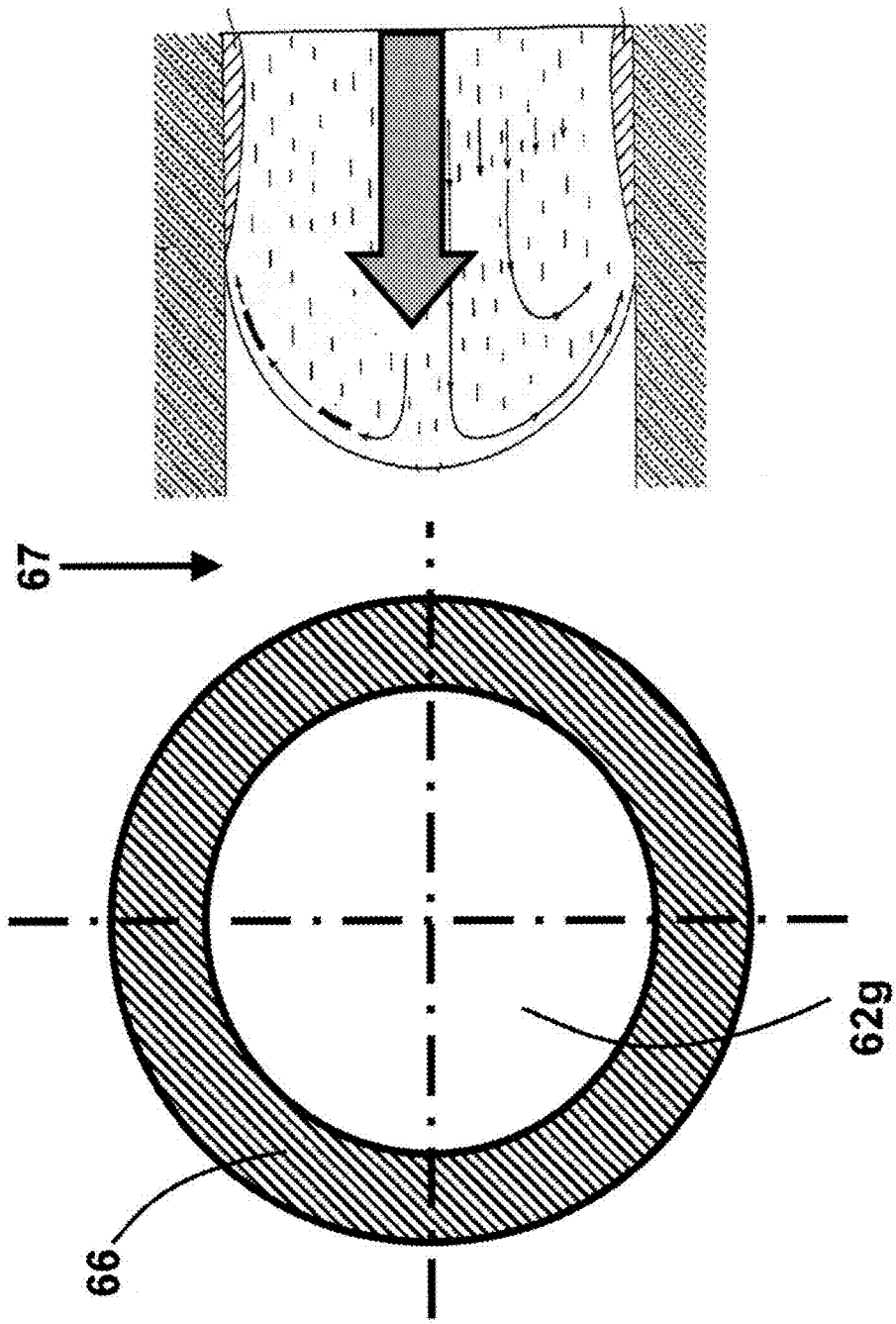

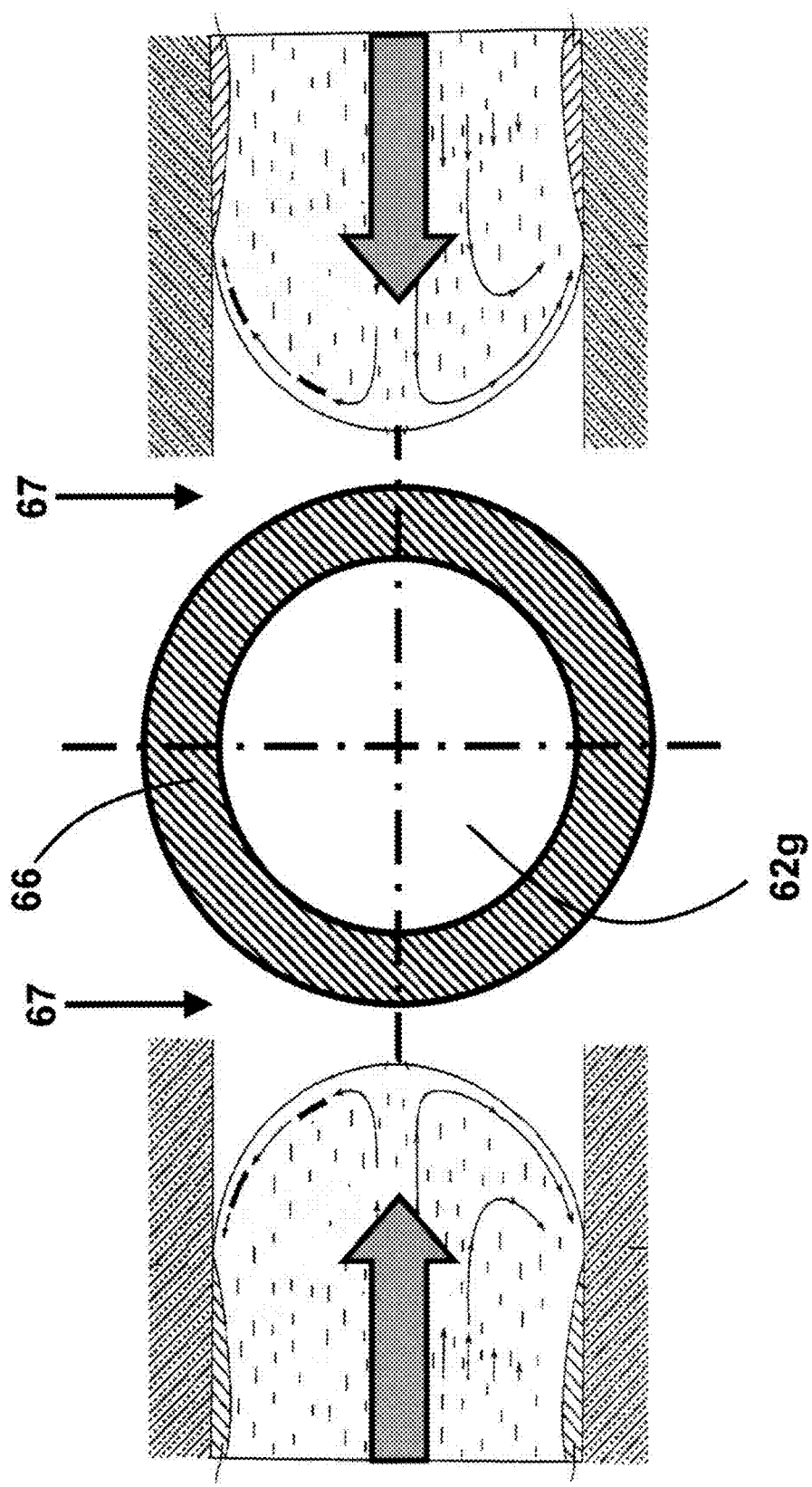

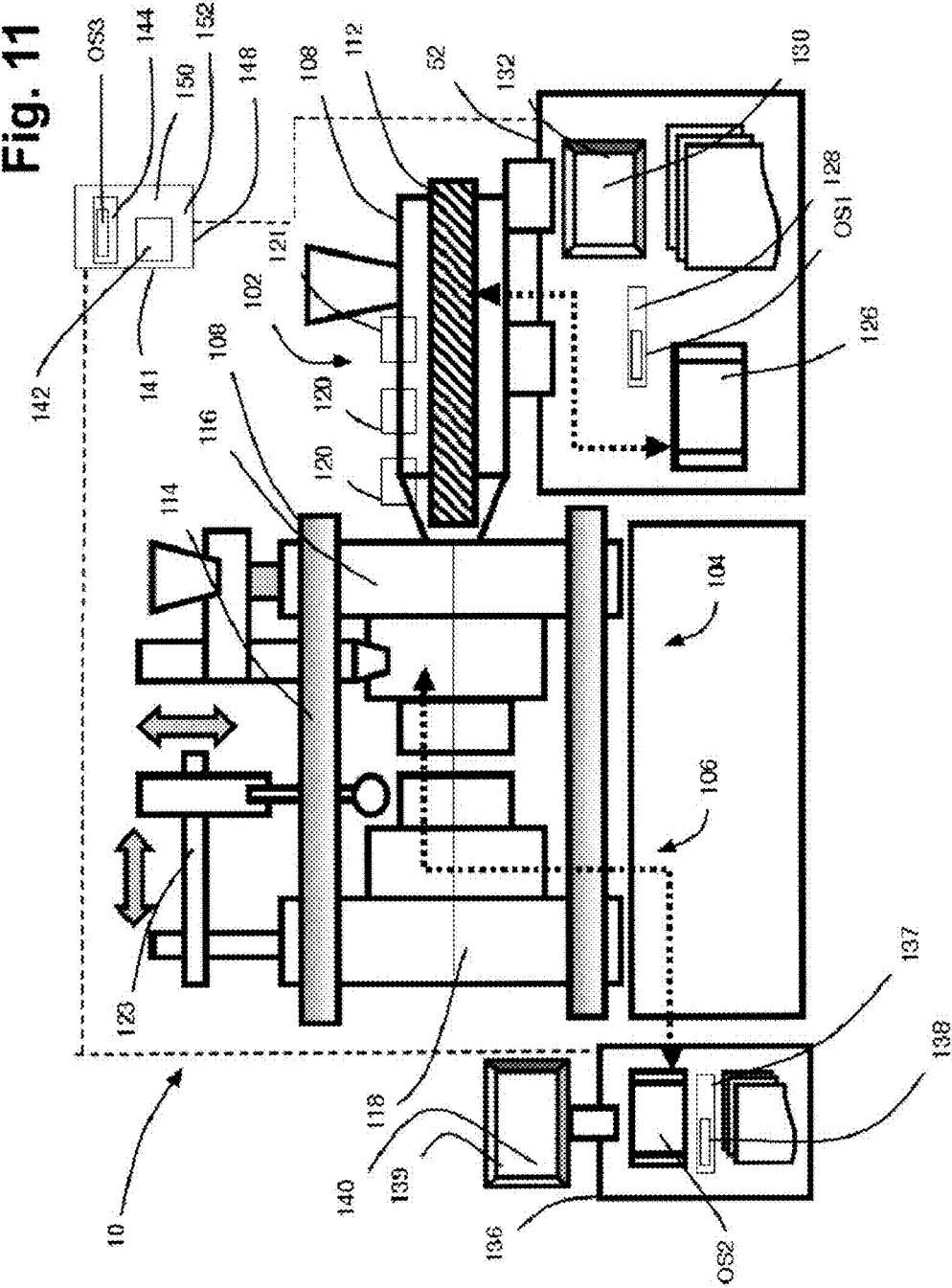

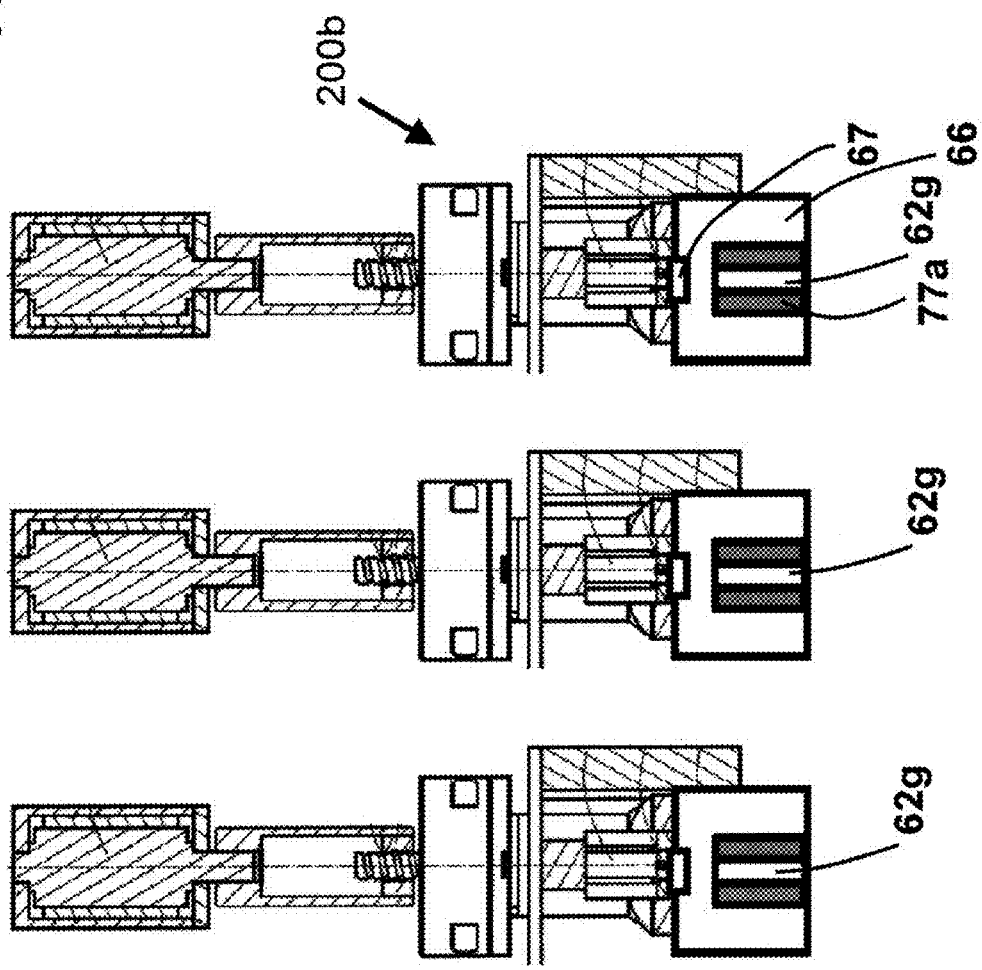

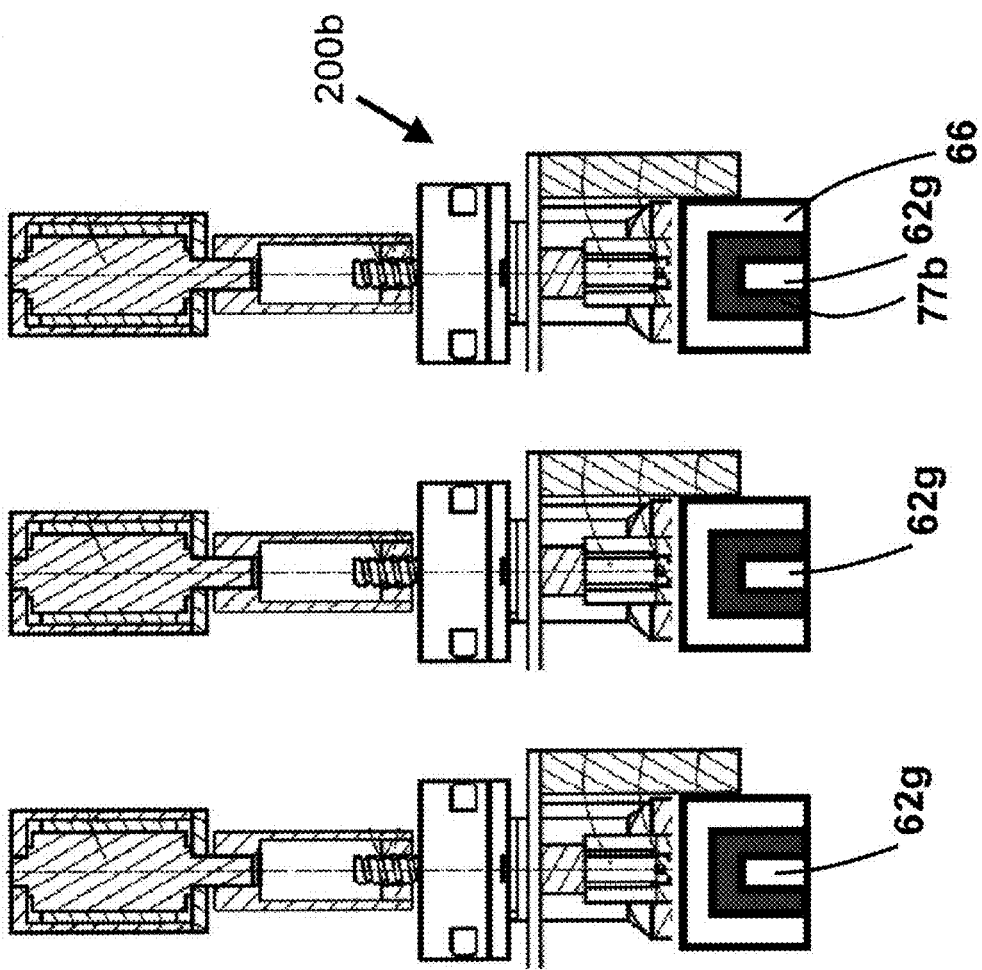

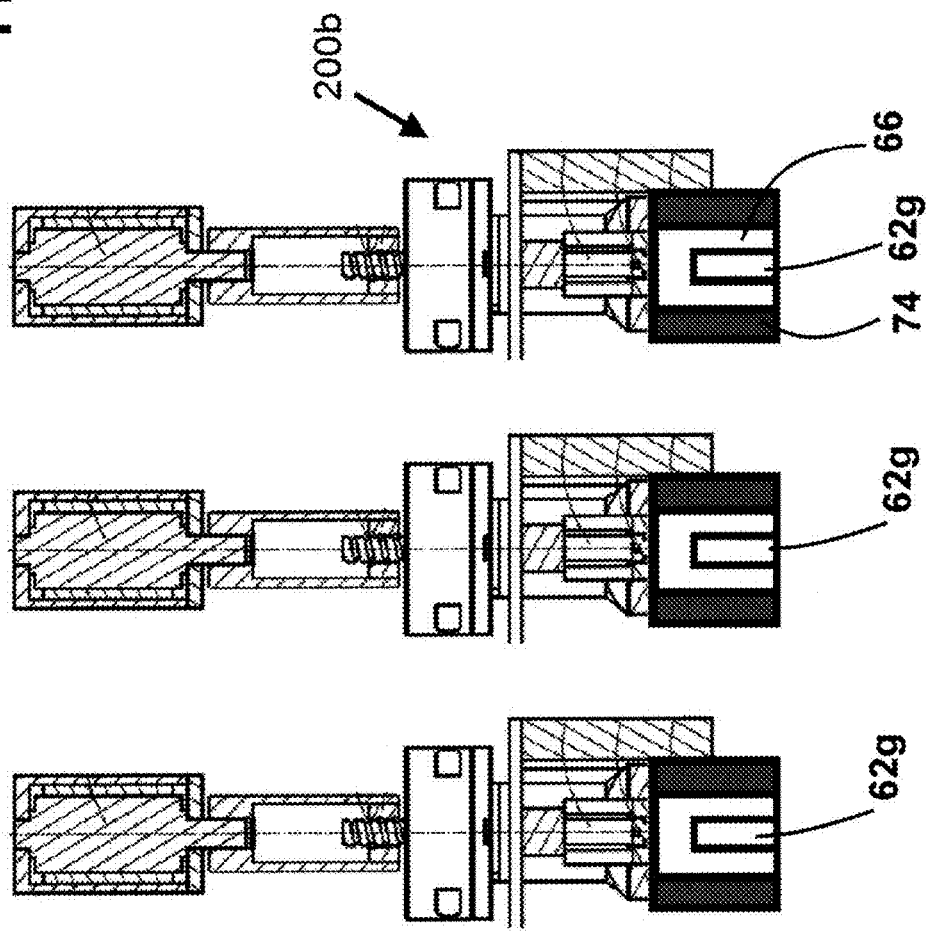

INJECTION MOLDING APPARATUS WITH HEATED MOLD CAVITIES

CROSS-REFERENCE TO RELATED APPLICATIONS

This application claims the benefit of U.S. Provisional Patent Application No. 62/090,765 filed Dec. 11, 2014. The contents of the aforesaid application are hereby incorporated by reference in their entirety for all purposes to the extent that such contents is not inconsistent with the present application.

TECHNICAL FIELD

This invention is related to a hot runner injection molding apparatus and to a method for the manufacture of moldable articles. More specifically, this invention is related to a hot runner injection molding apparatus with an improved temperature control of the mold cavity.

BACKGROUND

For the manufacture of injection molded articles and in particular when using hot runner nozzles for the manufacture of moldable articles, the temperature of the molten material on its way through a manifold, hot runner nozzles, and within the cavity is crucial for the later quality of the article in the same cavity, between cavities, during the same injection cycle and also between subsequent injection cycles. There have been made great efforts to control the temperature of all the components that guide the molten material to the cavity but these efforts did not yet resolve critical issues for hot runner nozzles.

In the first known design shown in FIG. 9 a single mold cavity has a single mold gate and molten material is injected via a single nozzle tip. The nozzle tip belongs to a hot runner nozzle that can have either a single tip or at least two nozzle tips. In these designs, the flow of molten material inside the mold cavity is split around and behind the mold core into two streams of molten material. The flow of these two streams of molten material in the cavity is affected by the presence of a thin frozen molded material layer that starts in the vicinity of the gate and can be formed not only on the cold walls of the cavity but also around the cold mold core. These frozen layers impact the feeling of the cavity and the quality of the part. Also a weld line will be formed behind the mold core when the two split streams of the molten material meet. The weld line could be visible or could weaken a molded part. Such weld lines are thus not desirable.

In the second known design, shown in FIG. 10, a single mold cavity has at least two mold gates and molten material is injected via two separate nozzles and two separate nozzle tips directly onto and around a mold core. In these designs there are two flow streams of molten material inside the mold cavity around the mold core. These streams are affected by the presence of a thin frozen molded material layer that starts in the vicinity of the gate and can be formed not only on the cold walls of the cavity but also around the cold mold core. These frozen layers impact the feeling of the cavity and the quality of the part. In these designs a flow line will likely happen when the two streams meet in the cavity. The weld line could be visible or could weaken a molded part. Such weld lines are thus not desirable.

Therefore there is a need met by this invention to extend the control of the temperature of the molten material and/or of the components guiding the molten material also to the cavity for an improvement of the quality of the molded articles.

SUMMARY

The following summary is provided to facilitate an understanding of some of the innovative features unique to the present invention and is not intended to be a full description. A full appreciation of the various aspects of the invention can be gained by taking the entire specification, claims, drawings, and abstract as a whole.

The present invention, as disclosed in the following description and the independent claims contribute to achieve the above object. Some embodiments of the invention are discussed in the following, i.e., in the specification and FIGS., and the dependent claims.

According to a first aspect, an injection molding apparatus for the manufacture of moldable articles is provided, comprising an injection manifold having at least one manifold input melt channel and a plurality of manifold output melt channels, the manifold is heated by at least one manifold heater, which is controlled by at least one manifold thermocouple.

The injection molding apparatus according to this aspect further comprises a plurality of hot runner nozzles coupled to the manifold. Each hot runner nozzle includes at least one input melt channel portion having a first axis and at least one output melt channel portion having a second axis.

The injection molding apparatus further comprises a first nozzle heater and a first nozzle thermocouple secured to each hot runner nozzle. In some instances an additional and independent heater is used in the vicinity.

The injection molding apparatus further comprises a plurality of mold cavities positioned to receive molten material from the plurality of hot runner nozzles. Each mold cavity has at least one mold gate orifice, which has in particular a third axis, the mold cavity includes a mold core and a mold cavity wall, where an outer surface of the mold core and the mold cavity wall define the mold cavity space that is formed in a mold closed position to receive molten material.

The injection molding apparatus further comprises in one embodiment a heater surrounding each mold cavity at least partially. In this respect, surrounding at least partially includes embodiments where the heater is arranged inside or outside the cavity wall or a core extending therefrom in at least an area surrounding the molding cavity. In one embodiment, the heater is substantially coaxial with an axis of the mold core. In some embodiments the heater has a heating element that is coupled to a removable sleeve that is removably attached to a wall of the mold cavity. This allows for a proper manufacturing, installation and removal of the heater from the mold cavity.

In some embodiments, the heater has a heating element that is coupled to a removable sleeve that is removably attached to a mold core of the mold cavity. In one embodiment, the heater fits closely with the mold core and is covered by a sleeve that shields the heater from the melt. In another embodiment, the heater itself is configured to contact the melt. This also allows for a proper manufacturing, installation and removal of the heater from the mold core. In some embodiments, the heater has a heating element that is coupled directly to the mold core acting as a support. This eliminates the need for a separate sleeve and reduces the size of the mold core and improves both the heat transfer and the cooling of the core. In these embodiments and for some applications either the mold cavity wall or the mold core include the heater and not both of them. In some embodiments and for some applications both the mold cavity wall and the mold core include the heater.

The injection molding apparatus further comprises a thermocouple associated with the mold cavity to measure directly or indirectly a temperature generated by the mold cavity heater. In another embodiment at least one thermocouple is associated with each mold cavity heater. In another embodiment at least one thermocouple is associated with each mold core heater.

The injection molding apparatus further comprises a controller which is linked to the nozzle thermocouple and to the nozzle heater and which is further linked to the mold cavity heater and to the mold cavity thermocouple. An activation of the mold heater and a deactivation of the mold heater during an injection cycle and between injection cycles and any changes in the temperature of the mold cavity wall or mold core are performed individually between each mold cavity in correlation with the quality information for each molded part as ejected from a corresponding mold cavity at the end of each injection cycle. In some embodiments the starting time and the duration of the heating step of the mold cavities varies from one cavity to another during a cycle time. In some applications the mold cavity wall and or the mold core are heated up prior to the injection step. In some applications the temperature of the mold cavity wall and or the mold core follow quick pulses.

In all embodiments the nozzle heaters and the mold cavity heaters and the corresponding thermocouples may be linked to either or all of a hot runner controller for the hot half including the nozzles and the manifold, a mold controller for the cold half that includes the movable mold half and the mold cores, an injection molding machine controller, an integrated machine and hot half controller and an integrated hot half and cold half controller. A portable controller coupled to the other controllers is also part of the embodiments.

In a further embodiment, the hot runner apparatus is provided for side gating and the hot runner nozzles are side gating hot runner nozzles. The invention is advantageously employable for all applications in injection molding. An improved temperature control of the mold cavity has in particular a positive effect on the product quality of side gated injection molded articles, as the temperature of the mold is an important factor for improving side gated products in particular with respect to flow lines and weld lines that are created when the flow of melt is split by the mold core In a further embodiment of the injection molding apparatus, the output melt channel portion has a second axis which is inclined relative to the first axis, and in that each of the hot runner nozzles includes a nozzle head portion, a nozzle body portion and a nozzle tip portion, the nozzles further include at least one nozzle tip having a nozzle tip melt channel and an associated nozzle tip seal.

In a further embodiment of the injection molding apparatus, each of the nozzles further includes at least one nozzle tip having a nozzle tip melt channel and an associated nozzle tip seal and in that the mold cavities have a mold gate opening to receive the nozzle tip seals.

In a further embodiment of the injection molding apparatus, the mold cavity heater has a sleeve and a heater element coupled and secured to the sleeve.

In all embodiments, the all nozzle heaters and the mold cavity heaters and the corresponding nozzle thermocouples and mold thermocouples may be linked to either all or some of these controller configurations that work together and communicate with each other, a) separate hot runner controller for the hot half including the nozzles and the manifold, b) a separate mold controller for the cold half that includes the movable mold half and the mold cores, c) a separate injection molding machine controller, d) an integrated machine and hot half controller, e) an integrated hot half and cold half controller, f) an integrated machine and hot half and cold half controller and g) a portable controller coupled to one or all the other controllers to provide additional functionality and backups.

A further embodiment of the injection molding apparatus comprises a second nozzle heater and a second nozzle thermocouple, which is located at the lower end of the nozzle in the proximity of the mold gate.

A further embodiment of the injection molding apparatus comprises a movable valve pin and a valve pin driving mechanism in each nozzle to control the flow of molten material in the cavity. The driving mechanism is either pneumatic or electric that are capable to drive the valve pin in several small steps or continuously.

In a further embodiment of the injection molding apparatus, the mold heater is a film heater that comprises a sleeve, a first electrical insulating layer deposited on the sleeve, an electrical element imprinted or etched on the first electrical insulating material and a second electrical insulating material deposited on the electrical element. Some embodiments of such a design are also known as film heaters.

In a further embodiment of the injection molding apparatus, the heater sleeve is made of two semi-circular sleeves, each having a separate heating element.

The invention refers in a further aspect to a method for the manufacture of moldable articles with an injection molding apparatus.

The injection molding apparatus according to the present aspect may comprise:
 an injection manifold;
 a plurality of hot runner nozzles coupled to the manifold;
 a first nozzle heater and a first nozzle thermocouple secured to each hot runner nozzle;
 a plurality of mold cavities positioned to receive molten material from the plurality of hot runner nozzles, the mold cavity including a mold core and a mold cavity wall;
 a mold cavity heater and a thermocouple associated with the mold cavity; and
 a controller linked to the first nozzle thermocouple and to the first nozzle heater and further linked to the mold cavity heater and to the mold cavity thermocouple,
 wherein the method may comprise the following steps:
 record the temperature of the mold cavity provided by the thermocouple associated with the mold cavity,
 adjust the temperature of at least one nozzle heater (36) based on the temperature measured by the mold cavity thermocouple and/or
 adjust the temperature of at least one mold cavity heater based on the temperature measured by the mold cavity thermocouple.

By use of this method, the controller can activate or deactivate one or more heaters, which deliver heat to the melt and to the components of the injection molding apparatus that affect the temperature of the melt or the mold cavity based on the temperature of the mold cavity. In the same way, the controller can adapt the heat delivered from one or more of these heaters.

In a further embodiment of the method for the manufacture of moldable articles according to the present aspect, the injection molding apparatus further comprises at least one valve pin and a valve pin driving mechanism in each nozzle. The method may comprise the additional step of controlling the movement of the at least one valve pin and the valve pin driving mechanism in each nozzle for controlling the flow of molten material in the at least one cavity based on the temperature measured by the mold cavity thermocouple. With this method there is a possibility to use the temperature of the melt flowing into the cavity and the temperature of the cavity walls and/or the cavity core to determine an appropriate movement of the valve pin for achieving high quality moldable articles.

In conjunction with the figures, the following description of further embodiments yields further advantages, features, and possible applications of the present invention.

BRIEF DESCRIPTION OF THE DRAWINGS

In the drawings, like reference numerals refer to like parts throughout the various figures unless otherwise specified. For a better understanding of the present invention, reference will be made to the following detailed description of preferred embodiments, which is to be read in conjunction with the accompanying drawings.

Shown are in:

FIG. 1a: a sectional view of an exemplary injection molding apparatus in accordance with the invention to improve the known prior art design shown in FIG. 10;

FIG. 1b a detail of the exemplary injection molding apparatus of FIG. 1 with indications of section planes A-A, B-B and C-C;

FIG. 1c schematic views in the sectional planes A-A, B-B and C-C of the exemplary injection molding apparatus of FIG. 1a;

FIG. 2: a sectional view of a further exemplary injection molding apparatus in accordance with the invention to improve the known prior art design shown in FIG. 9;

FIG. 3: an enlarged view of the area of the injection mold of the exemplary injection molding apparatus of FIG. 2;

FIG. 4: a spatial view of the area of the injection mold of the exemplary injection molding apparatus of FIG. 2;

FIG. 5b: a spatial view of the exemplary mold cavity heater of FIG. 5a;

FIG. 5c: a top view of the exemplary mold cavity heater of FIG. 5a;

FIG. 5d: a detail of the exemplary mold cavity heater of FIG. 5a;

FIG. 6b: an exploded view of the exemplary mold cavity heater of FIG. 6a;

FIG. 7b: a spatial view of the exemplary mold cavity heater of FIG. 7a;

FIG. 8a: a spatial view of the area of the injection mold similar to FIG. 4;

FIG. 8b: a sectional view of the mold insert of FIG. 8a;

FIG. 8c: a spatial view of the mold insert of FIG. 8b;

FIG. 8d: a cross sectional view of a mold core and a heater coupled to an outside and lateral surface of a mold core.

FIG. 8e: a cross sectional view of a mold core and a heater coupled to an outside and lateral and top surface of a mold core.

FIG. 9: the flow of molten material in a prior art cavity;

FIG. 10: the flow of molten material in a further prior art cavity;

FIG. 11: a view of the controller options; and

FIGS. 12a-12c show sectional views of further exemplary injection molding apparatuses in accordance with the invention for straight gating nozzles.

DETAILED DESCRIPTION OF PREFERRED EMBODIMENTS

Figure 5B:
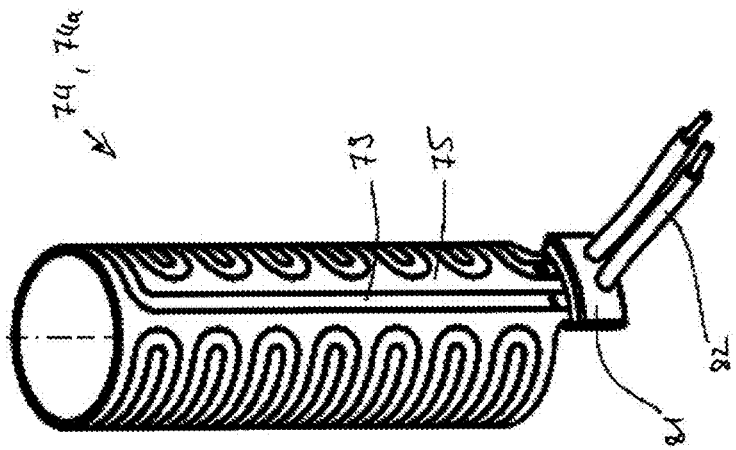

Reference is made to FIG. 1a, which shows an injection molding apparatus 100 in accordance with an exemplary embodiment of the present invention. This exemplary embodiment is related to the flow of molten material. The apparatus 100 includes an injection manifold 10, a plurality of open gated side gating hot runner nozzles 200 and a mold 62. Molten material (also referred to as melt) flows from the manifold through the nozzles 200, and into mold cavities 66 in the mold 62. The flow of molten material in the cavity is similar to the flow shown in FIG. 9 with the additions of the present invention shown in detail in FIGS. 4-5-6-7-8.

The manifold 10 has at least one manifold input melt channel 11, a hot runner melt channel system 28 and a plurality of manifold output melt channels 13. The manifold 10 is heated by at least one manifold heater 30, which may be, for example, a fluid passage system that permits the flow of heated liquid there through. The temperature of the manifold 10 may be determined by at least one manifold temperature sensor 31 (e.g. a thermocouple) that transmits signals indicative of the manifold temperature to a control system (not shown). The controller controls the operation of the manifold heater 30 based on data from the temperature sensor 31.

A plurality of side gating hot runner nozzles 200 are coupled to the manifold 10. Each of the hot runner nozzles 200 includes a nozzle head portion 12, a nozzle body portion 21 and a nozzle tip portion 23. The nozzles 200 each further include at least one nozzle tip 14 having a nozzle tip melt channel 3 there through, and an associated nozzle tip seal 16. The nozzle tip melt channel 3 forms at least part of the output melt channel portion.

A nozzle heater shown at 36 is secured to each hot runner nozzle 200 for heating melt passing through the nozzle 200. Optionally a plurality of nozzle heaters are secured to each hot runner nozzle 200. The nozzle heater 36 may be any suitable type of nozzle heater known in the art, such as a resistance heater as is commonly used in hot runner injection nozzles.

A nozzle temperature sensor (e.g. a thermocouple, not shown) may be secured to each hot runner nozzle 200 so as to permit the control system (not shown) to determine the temperature of melt in the nozzle 200.

A mold, shown generally at 62, includes the first and second mold plates 62a and 62b, and further includes a third mold plate 62c and a fourth mold plate 62d. The third and fourth mold plates 62c and 62d include a set of first and second mold plate inserts shown at 62e and 62f respectively. The inserts 62e and 62f together cooperate with mold cores 62g and sleeves 62h to define a plurality of mold cavities 66. In the example shown, a plurality of sets of inserts 62e and 62f are provided, each set being associated with two mold cavities 66, and one hot runner nozzle 200. In another exemplary embodiment (not shown), each set of inserts 62e and 62f could be associated with a single mold cavity, and with one hot runner nozzle 200. At the cavity wall of insert 62f, a mold cavity heater 74 is arranged which serves for tempering the wall of the mold cavity 66. Optionally a second mold cavity heater 76 is arranged at the core 62g, which serves for tempering the surface of the mold core 62g.

A plurality of mold cooling passages 22 are provided in the mold 62 (specifically in the inserts 62e and 62f in the embodiment shown in FIG. 1), to permit the flow of coolant there through for cooling the mold 62 in order to solidify the melt in the mold cavities 66.

The engagement of the nozzle tips 14 with the tip seals 16 and the engagement of the tip seals 16 with the mold gate openings 84 serves to fix the position of the nozzle 200 axially and laterally and also fixes the lower end of the nozzle 200 so that, when heated, the nozzle 200 generally grows upwards towards the manifold 10 during thermal expansion.

FIG. 1b shows a detail of the exemplary injection molding apparatus of FIG. 1a with indication of the section plane A-A which is arranged perpendicular to the melt channel of the nozzle, and section planes B-B and C-C which are arranged perpendicular to the mold cavity 66 and mold core 62g at the position of the third axis 69 of the mold gate orifice 67.

FIG. 1c shows schematic sectional views in the sectional planes A-A, B-B and C-C of the exemplary injection molding apparatus of FIG. 1a. Section A-A shows a section view perpendicular to the melt channel 17 of the nozzle body 21. As is illustrated in FIG. 1c, the temperature of the melt near to the wall of the nozzle melt channel 17 (section A-A) is higher than the temperature of the melt flowing through the center of the melt channel. This is due to the proximity of the nozzle heater 36 to the melt channel 17 and to the internal shear stress induced heat generated via friction during the injection through the melt channel 17. In FIG. 1c the flow shown in cross section A-A is somehow an ideal situation showing a quasi-symmetrical heat pattern and viscosity distribution of the molten material. In a practical application, the manifold 10 will provide a non-symmetrical heat pattern at the exit of the manifold melt channels and at the entrance of each nozzle. For this reason, the viscosity distribution of the molten material through melt channel 17 shown in section A-A will be similar but more symmetrical compared with the heat patterns and viscosity profiles shown in FIG. 1c for sections B-B and C-C. If this the real case, then the heat flow pattern and viscosity patterns in the two mold cavity shown in FIG. 1c for sections B-B and A-A will be more different than what FIG. 1c shows for the ideal case. In these circumstances the flow balance in each cavity is even more asymmetrical between cavities fed by a single nozzle and between cavities fed by several nozzles. In order to address this issue FIGS. 3-5-6 show a mold cavity heater 74a or 74b that is located in the mold cavity surrounding a mold cavity wall and a mold core. Heaters 74a and 74b according to this invention need to be made to achieve a very quick response to controlled heating pulses ON and OFF. For this reason the heaters need to be coupled to thin heater sleeves.

Sections B-B and C-C of FIG. 1c show a situation, where the molded material from nozzle melt channel 17 is flowing through the mold gate orifices 67 and into the cylindrical cavity 66 with a cylindrical, or other shape, mold core 62g arranged coaxial in the center of the cavity 66. In reality and in practical situation the According to the temperature distribution of the melt, melt with different temperature ranges enters into the cavity 66. At the contact region of the molded material with the wall of the cavity 66, a frozen material layer can develop if the temperature of the melt and/or the temperature of the wall of the cavity 66 is not sufficiently high. For preventing freezing of the melt and thus the risk of an uneven form filling process, this invention proposes to provide heat to areas in which an undesired frozen material layer can develop during the form filling process. An exemplary provision of heat in sections B-B and C-C of this embodiment is schematically indicated by arrows in FIG. 1c.

FIG. 2 shows a further injection molding apparatus 100a in accordance with an exemplary embodiment of the present invention. The apparatus 100a includes an injection manifold (not shown), a plurality of valve gated side gating hot runner nozzles 200a and a mold 62a. Each mold cavity 66a, 66b has two mold gate orifices 67 through which molten material is injected into the cavity by means of two side gating hot runner nozzles 200a. The mold cavities 66a and 66b have a different shape, a different size and a different volume to be able to mold simultaneously different parts within one cycle and this is called a family mold. The use of electrically driven valve pins ensures that mold cavities of different shape, size and volume are properly filled even if they are different by actuating the valve pins in the on/off positions differently between the cavities. The valve pins 33 are actuated by means of electric drives 34 having either position encoders or position sensors. The flow of molten material into the cavity is similar to the flow shown in FIG. 10 with the additions of the present invention shown in details in FIGS. 3-8.

FIG. 3 shows an enlarged view of the area of the injection mold 62a of the exemplary injection molding apparatus 100a of FIG. 2. The tip 14 of the nozzle 200a is arranged at the orifice of the cavity 66a which is closed by the valve pin 33. The mold 62a comprises a mold insert 62o within which the mold cavity 66a is arranged. A mold core 62p is arranged in the mold insert 62o. The mold insert 62o and the mold core 62p define the mold cavity 66b. A mold cavity heater 74a surrounds the mold insert 62o and provides heat to the wall of the mold cavity 66a. An optional mold cavity heater 76a is arranged at the mold core 62p for providing heat to the surface of the mold core 62p and thus to the cavity 66a. A plurality of mold cooling passages 22 are provided in the mold 62, to permit the flow of coolant there through for cooling the mold 62 in order to solidify the melt in the mold cavities 66. The sleeve of the heater 74a is thin to enable a fast cooling of the molten material after injecting. As shown in FIG. 3 and in FIGS. 8a/b/c the nozzle tip 14 protrudes an area around the nozzle tip and gets heated by the sleeve of the heater. FIGS. 8a/b/c provide additional details for the opening or aperture 85 located at the mold cavity heater 74a, that is configured to accept a portion of the nozzle tip. By heating the area around the mold gate orifice the quality of the valve pin vestige or mark noticeable on the mold part.

FIG. 4 shows a spatial view of the area of the injection mold of the exemplary injection molding apparatus of FIG. 2. When mounting the mold 62a, the mold insert 62o receives the mold cavity heater 74a, which surrounds the mold insert 62o after mounting. The heater shown in FIG. 4 is a film heater having only little mass, which is advantageous for frequent temperature changes.

Figure 5A:
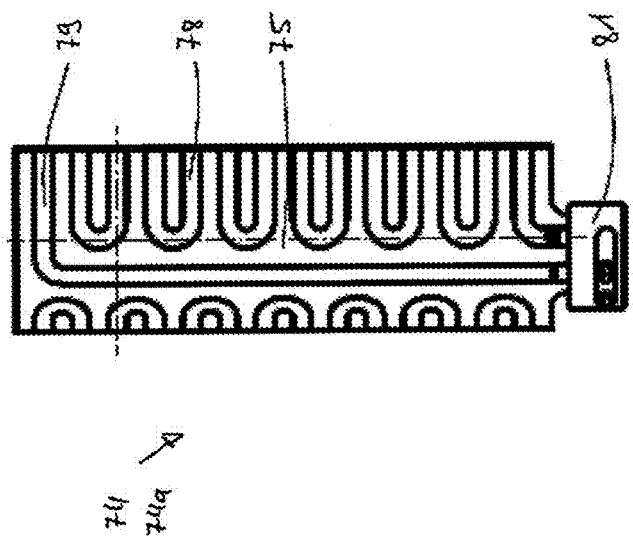
FIG. 5a: a front view of an exemplary mold cavity heater.

FIG. 5a shows a front view of an exemplary mold cavity heater 74, 74a, which comprises an inner sleeve 75 and a film or a flat heating element 78 which can be made up of a flat element or in particular be printed or etched on the sleeve as mentioned in further detail in another bellow portion of the current description The exemplary nozzle heater 74,74a also comprises a thermocouple 79 for determining the temperature of the mold cavity heater 74, 74a. The sleeve 75 comprises on its outer surface an insulating layer. At the inner sleeve 75 a connector 81 is arranged, for connecting the wiring 82 to the energy supply.

FIG. 5*b* shows a spatial view of the exemplary mold cavity heater 74, 74*a*. FIG. 5*c* shows a top view of the exemplary mold cavity heater 74, 74*a* of FIG. 5*a*. FIG. 5*d* shows a detail of the exemplary mold cavity heater 74, 74*a* of FIG. 5*a*. In the detail, the inner sleeve 75, an outer sleeve 83 (which comprises an insulating layer at its inner surface) and a flat heating element 78 are depicted.

Figure 6A:
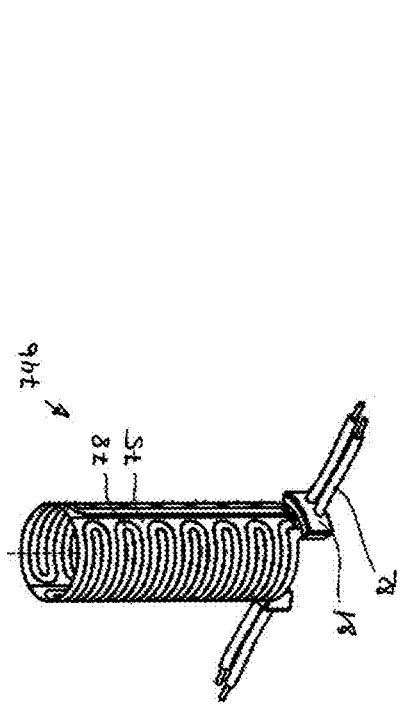
FIG. 6a: a spatial view of a second exemplary mold cavity heater.
Figure 6B:
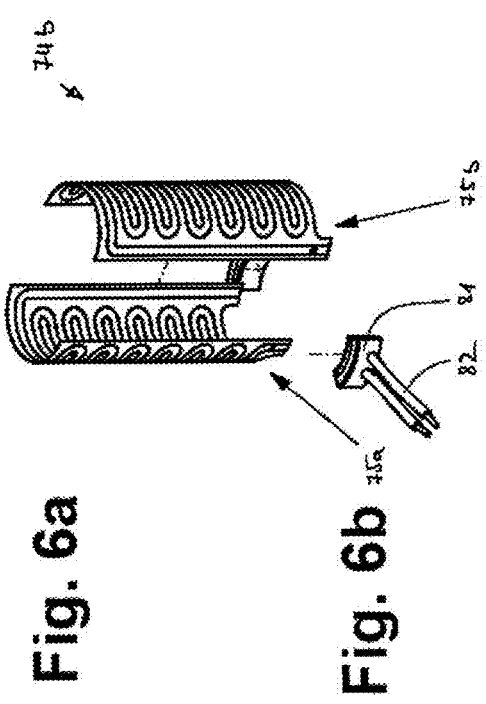

FIG. 6*a* shows a spatial view of a second exemplary mold cavity heater 74*b* which differs from the exemplary mold cavity heater 74, 74*a* in that it is composed of two semi-circular elements which, when mounted surrounds a mold insert 62*o*. FIG. 6*a* shows the exemplary mold cavity heater 74*b* in a joint condition and FIG. 6*b* shows an exploded view of the mold cavity heater 74*b*. The mold core heater 76 can have the same structure as the mold cavity heater 74, 74*a* or 74*b*.

Figure 7B:
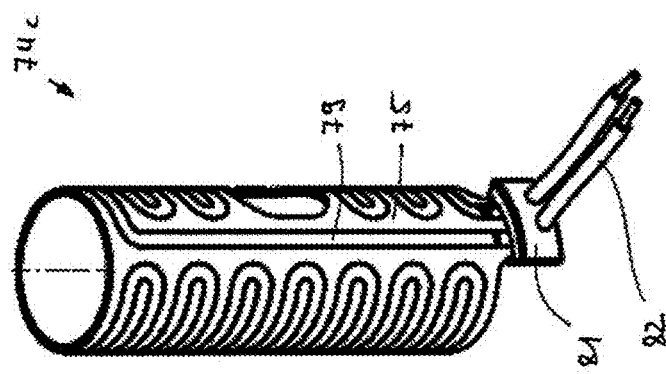
Figure 7A:
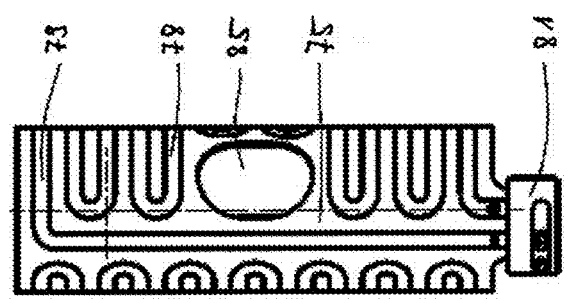
FIG. 7a: a front view of a further exemplary mold cavity heater.

FIG. 7*a* shows a front view of a further exemplary mold cavity heater 74*c*, which differs from the exemplary mold cavity heater 74*a* in an opening 85. The opening 85 serves for example as a passage of the tip of an injection nozzle as is shown in FIG. 3. FIG. 7*b* shows a spatial view of the exemplary mold cavity heater of FIG. 7*a*.

FIG. 8*a* shows a spatial view of the area of the injection mold similar to FIG. 4. FIG. 8*b* shows a sectional view of the mold insert of FIG. 8*a* and FIG. 8*c* shows a spatial view therefrom. The depicted elements have been described above. In FIGS. 8*a*, 8*b* and 8*c* the mold cavity heater 74*c* is now coupled to the mold cavity insert 62*o*. The design of the mold insert shown in FIG. 8*b* can also be used for a mold core. In doing so, the component depicted with 62*a* is the mold core, which is surrounded with a mold core heater 74*a* that is either designed to have contact to the melt or a heater sleeve may be arranged over the mold core heater for protection. The inner space of the illustrated mold core serves for water-cooling. In use, the mold core will be arranged in a mold cavity and a molded part will be formed over this mold core. FIGS. 8*d* and 8*e* show a mold core including a water cooling tube and a first mold core film heater exposed to molten material 8*d* and a mold core heater protected by an outer sleeve making contact with melt flowing around the cavity.

Reference is made to FIG. 11, which shows a portion of a hot runner injection molding system 10 that incorporates the hot runner systems shown in FIGS. 1*a* and 2 and also the mold cavities shown in FIGS. 3-4 and the mold heaters shown in FIGS. 5*a*-*b*-*d* and FIGS. 6*a*-*b*. FIGS. 7*a*-*b* and FIGS. 8*a,b,c* explained before.

The injection molding system 10 includes an injection molding machine 102, a hot half 104 and a cold half 106. The injection molding machine 102 includes an injection unit 108 and a clamping unit 110. The injection unit 108 may include a motor driven screw 112. The clamping unit 110 may include a plurality of hydraulic rams 114 that bring a first platen 116 and a second platen 118 towards and away from each other. A plurality of processing sensors 120 may be provided to detect, among other things, at least one of the temperature of molten material being injected by the injection unit 108, the pressure of the molten material, motor current draw on the motor that powers the screw 112 and any other suitable processing information. The screw 112 is an example of a temperature-conditioning element to help provide molten material. The sensors 120 are examples of injection molding machine sensors and any other type of sensor may additionally or alternatively be provided.

An injection molding system controller 52 is provided to assist in controlling the operation of the injection molding system. For example, the injection molding system controller 52 may control the operation of the rams 114 and the screw 112. The controller 52 receives signals from the sensors 120 and processes the signals and based on this, it controls the rams 114 and the screw 112, and it may control a robot 123 used to remove molded elements from the mold cavities 124. The controller 52 may include a processing unit 126, a memory 128 which stores among other things, a first operating system OS1 and a user interface 130 that may include a display 132 and an input device, such as a plurality of buttons or a keyboard.

A hot runner apparatus controller 136 may be provided for controlling the temperature conditioning elements (e.g. the nozzle heaters) in the hot half 104, and also for controlling the operation of the valve pins shown in FIG. 2.

Also controller 136 is linked and used in conjunction with the mold cavity heaters and thermocouples shown in FIGS. 3, 4, 5, 6, 7 mentioned below.

The controller 136 includes a processing unit 137, a memory 138 with an operating system OS2, a user interface 139 with a display 140 and an input unit such as a keyboard or buttons.

A third controller 141 is provided for some applications that is portable and has a processing unit 142, a memory 144 with a third operating system OS3 stored therein, and a user interface 148 that may, for example, include a display 150 and a touch screen 152. The controller 141 may communicate wirelessly with the controllers 52 and 136. The third controller 141 may be used by a person such as a supervisor who walks around a manufacturing facility with the controller 141 and can control each injection molding system from the controller 141, without having to walk up to the individual controllers 136 and 52. Furthermore, the controller 141 may receive processing data from the controllers 136 and 52 and may display it for the supervisor. The controller 141 may be used to send commands to the injection molding machine 102 and the hot runner apparatus 104. The controller 141 may be used to receive processing data from two or more injection molding systems simultaneously, or sequentially. The controller 141 may receive processing data from two or more injection molding machines simultaneously and may display the data or related data from both simultaneously on display 150 so the supervisor can compare the operations of the two. Similarly, the controller 141 may receive processing data from two or more hot runner apparatuses simultaneously and may display the data or related data from both simultaneously on display 150 so the supervisor can compare the operations of the two. The controller 141 may be configured to control parameters of the operation of the system 10 that are different than the parameters that are controllable from the controllers 52 and 136. For example, the controller 141 may be capable of controlling more parameters than are possible with the controllers 136 and 52 so as to limit the control available to the machine operators relative to the control that the supervisor has.

The controller 141 may be configured alternatively to control less than the controllers 136 and 52.

The controllers 52 and 136 need not have displays since the controller 141 has one. Thus an advantage is provided by system 10 using a single display (i.e. display 150) instead of multiple displays.

The controller 52 may be provided by the manufacturer of the injection molding machine. The controller 136 may be provided by the manufacturer of the hot runner apparatus and may be different than controller 52 and OS2 may be entirely different than OS1. The controller 141 may again be provided by yet another manufacturer with yet another different operating system (referred to as OS3) but may be capable of communicating with both controllers 52 and 136, even though they may not able to communicate with each other.

Another controller 141 may be provided so as to permit multiple supervisors to roam a manufacturing facility and see the same or different data relating to one or more systems 10.

Other sensors that may be provided as sensors 28 and/or sensors 120 may include cameras permitting a supervisor to see certain aspects of the operation of a system 10 remotely.

While the above description constitutes a plurality of embodiments of the present invention, it will be appreciated that the present invention is susceptible to further modification and change without departing from the fair meaning of the accompanying claims.

In another embodiment of the invention shown in FIGS. 12a-b-c the hot runner nozzles 200 b are not configured for side gating but for the so called straight gating. In these configuration, the hot runner nozzle melt channels are either collinear or parallel with an axis of the mold cores. Also the molt gate orifices are not lateral but collinear or along an axis parallel to the mold cores. The hot runner nozzles can be either open gated or thermal gated or they may include a movable valve pin that opens or closes the flow of a molten material from the nozzle and via the nozzle tips and through the mold gate orifice into each mold cavity.

Each hot runner nozzle 200b includes either a single nozzle body heater or a nozzle body heater and a separate nozzle tip heater. The temperature of all the nozzle heaters is controlled by associated nozzle thermocouples.

In the embodiment of FIG. 12a the temperature of the mold cavity 66 is regulated by a mold core heater 77a coupled to the mold core 62g. The mold cavity heater 77a is coupled to the core via a fixed or a removable heater sleeve or the mold cavity heater can be made directly onto the core having a protective layer or sleeve. A thermocouple coupled to the core or to the mold core heater is used to control the temperature generated in the cavity by the mold core heater.

The embodiment of FIG. 12b is similar to the embodiment of FIG. 12a except that the mold core heater covers the top portion of the mold core.

In the embodiment of FIG. 12c the cavity is heated by a mold heater 74 coupled to a wall section of the mold and surrounds the mold core 62g. A thermocouple located in the cavity will control the amount of heat, the starting point of the heater and the duration of the heating time via a controller that is also configured for the embodiments of FIGS. 12a-b.

In all embodiments shown in FIGS. 12a-b-c the thermocouples located in the mold cavity (either on the mold cavity wall or the mold core) are linked to the controller shown in FIG. 11.

In all embodiments of the invention shown in FIG. 1 through FIGS. 12a-b-c the thermocouples located in the mold cavity (either on the mold cavity wall or the mold core) are linked to the controller shown in FIG. 11. These thermocouples are configured to also increase, decrease, stop or start the nozzle heaters in order to make sure that each cavity receives molten material at a temperature that corresponds to a balanced flow in each cavity.

In all embodiments of the invention shown in FIG. 1 through FIGS. 12a-b-c the thermocouples located in the mold cavity (either on the mold cavity wall or the mold core) are linked to the controller shown in FIG. 11. These thermocouples are further configured to also determine the time for opening and closing of the flow of molten material into the cavity via commends generated by the controller shown in FIG. 11.

The movement of the valve pin is generated by electrical or pneumatic actuators and piston sensors coupled to the nozzles allow to determine the position of each valve pin relative to the mold gate orifice.

In all the embodiments of the invention the mold heaters coupled to the mold cavity wall or to the mold core are made using the following materials and components. Other methods for manufacturing these mold cavity temperature heaters can be made using other materials or components.

Background information regarding the methods of manufacturing and the elements and the materials for the mold cavity heaters 74a and 74b and the mold core heaters 77a, 77b and 74 can be found for example in U.S. Pat. Nos. 5,973,296; 6,305,923; and 7,569,799, which are herein incorporated by reference. Passages of U.S. Pat. No. 7,569, 799 are reproduced in the following; however it is noted that the following subject matter is not claimed.

Each heater placed on the mold core or on the mold cavity wall includes a composite body having a steel base element onto which is mounted a deposited heater layer, said base element being made of a precipitation hardened steel.

Precipitation hardened steels offer the feature that intermetallic precipitates form during cooling and that they entail—besides the volumetric reduction merely caused by the drop in temperature—a further reduction of the volume of said steel element. Therefore a precipitation hardened steel will shrink during the age hardening process and consequently the precompression of a heater layer previously deposited on a base element surface will be magnified following hardening. The layer is always and permanently firmly joined to the steel element surface even when the compound body is exposed to high temperature and compressive loads.

By using high-alloy steels, the magnitude and the distribution of the precompression within the insulating layer may be adjusted in especially accurate and precise manner, this feature being foremost significant when the steel element exhibits a round or convex surface receiving the insulating layer or when the steel element assumes a tubular geometry and the heater layer must be deposited on the outer The base element offers special advantages by being a manifold or a material feed tube of a hot duct system. It is especially important in the field of hot ducts that the injection molding material being fed to a molding nest is precisely and uniformly temperature controlled as far as into the zone of the nozzles, i.e. the feed orifices. Cracks in the heater layer would immediately entail nozzle failure and interruption of manufacture: this eventuality is effectively precluded by the composite body design of the invention.

Preferably the heater layer consists of a composite layer built up of several strata and/or stratum elements and comprising an insulating layer deposited on the base element. The base element is a ceramic or glass-ceramic insulating layer which, depending on the deposition procedure and desired layer thickness, may consist of two or more individual strata. A configuration of resistance elements is deposited on said insulating layer.

Advantageously as regards manufacture, the insulating layer, furthermore the resistance elements and/or the top coat are baked dispersions, for instance thick film pastes. Said pastes may be deposited uniformly and in finely controlled manner to positively affect subsequent adhesion and heating operability. Alternatively the individual strata or partial strata of the heater layer may be baked-on foils.

In another embodiment, at least one temperature sensor is configured in the plane of the heater layer in order to ascertain both the temperature distribution and its genesis within the heater, i.e. inside the base element. Accordingly said temperature sensor is configured within the compound stratum without entailing sensible increase in volume. At the same time temperature changes may be detected practically at the time they take place and in very accurate manner.

Hookup terminals for the resistance elements and/or the temperature sensors are integrated into the heater layer. In this manner the heater as a whole may be directly integrated into a control circuit.

Further important advantages are attained using a compound body of the invention when said compound body is configured in a hot duct manifold and/or a hot duct nozzle. The stratified deposition of the heater assures a firm and permanent connection to the base element wall and hence secures firm adhesion to the hot duct manifold or the hot duct nozzle. Moreover the invention most effectively precludes spalling or detachment of the heater in that the precompression in the heater layer is raised in controlled manner by precipitation hardening.

Because direct coating achieves thinness, the heater layer is very compact and as a result, compared to conventional heating designs and at nearly identical performance, very compact designs are made possible by the present invention. Furthermore power density may be substantially increased because the heat is generated directly at the surface of the hot duct element to be heated and can be directly dissipated from it. The usually sensitive heater elements are therefore reliably precluded from overheating.

As regards a method for manufacturing a compound body comprising a steel base element on which is deposited a heater layer, the invention provides therein reinforcement of a pre-existing precompression in the heater element by precipitation hardening the base element.

Said method of the invention is both simple and economical and results in a firm, permanent connection between the base element and the heater layer because said heater layer is shrunk further within defined limits by the displacement of contraction of the base element due to cooling while hardening, as a result of which a highly stress-tolerant connection is produced. All heater strata or partial strata exhibit extraordinarily good adhesion. In particular the insulating layer permanently withstands even extreme mechanical and thermal loads, and consequently optimal products are always attained.

Each stratum or stratum element of the heater layer is deposited on the base element, dried and baked/formed, and following each baking, the compound body is cooled to room temperature. In this manner all method parameters may be individually matched to the particular heater layer that, depending on the required power, may thus be optimally deposited.

Moreover, the invention calls for homogenizing, i.e. solution annealing the steel alloy of the base element during baking, such a procedure being especially advantageous regarding the method economy. A contribution to this advantageous feature is made by providing the baking temperature be the same as the homogenizing, i.e. solution annealing temperature of the base element. As the individual strata or layer elements of the heater layer are being formed, stable mixed crystals ($\alpha$ crystals) are produced by means of said solution annealing. Therefore separately controlled manufacturing stages are no longer required.

In another embodiment, the individual strata may be deposited using screen printing, dispensers, by immersion or spraying. Therefore the optimal procedure may be selected at each method step. All stratum parameters such as stratum thickness, density, shape and the like may be adjusted uniformly and accurately, always attaining thereby a functional heater layer.

Each stratum or stratum element can be baked or formed in an atmospheric ambience, the baking temperature being between 750 and 900° C.

The base element's surface can be roughened. e.g., sand blasting before the heater layer is deposited. Such a feature improves the mechanical adhesion of the insulation layer. Chemical adhesion may be optimized by cleaning and oxidizing the base element before coating.

After the heater layer has been deposited, the steel alloy of the base element is aged, i.e., age hardened by renewed annealing. Fine intermetallic precipitates are formed allowing a targeted reduction of base element volume. In this process compressive stress is generated within the heater layer deposited on the base element making it possible to permanently balance mechanical loads applied to the base element, for instance the inner pressure loads on a material feed tube of a hot duct nozzle.

Another important aspect of the invention is that that the age hardening temperature can be less than the baking temperature of the individual strata of the heater layer. As a result, neither forming the individual strata, i.e. of the heater layer, nor its cohesion, shall be interfered with. Furthermore the precompression in the heater layer is optimally increased without its performance parameters or functionality being degraded. The overall procedure may be controlled using simple means and therefore the costs of the method remain low.

Appropriately the age hardening procedure is carried out in air or under a nitrogen atmosphere.

Further features, particulars and advantages of the present invention follow from the wording of the claims as well as being elucidated in the description below of illustrative embodiments of said invention.

In one preferred embodiment mode of the invention, the initial material used in making the base element is a precipitation hardening steel, highly alloyed with Ni, Co, Mo, Ti and/or Al, for instance X 3 Cr Ni Al Mo 12 9 2 1. Illustratively the base element constitutes a material feed tube having a cylindrical surface for an externally heated hot duct nozzle used in an injection mold.

A heater layer is deposited on the base element. This heater layer consists of an insulating glass-ceramic stratum directly resting on the base element, furthermore of a configuration of resistance paths mounted on said insulating stratum and acting as a heating element, and thereabove a top coat to protect the heater layer against external factors. The heater layer and the base element are connected to each other in undetachable manner and thereby constitute a compound body.

Typically the precipitation hardening of the material feed tube takes place in two stages, namely solution annealing the alloy and subsequent aging, i.e, age hardening.

However, before the above is carried out, the individual strata or stratum elements of the heater layer are deposited in the form of thick film pastes and are baked, i.e. formed, solution annealing of the metal alloy being carried out simultaneously with baking the thick film pastes.

Also, at the beginning of the method of the invention, the still unhardened steel element will be sand-blasted once it has been mechanically processed in order to improve the adhesion relating to the heater layer, a specified surface roughness being required. Thereupon the material feed tube is cleaned with ethanol and warm nitric acid (HNO3) and oxidized at about 850° C. As a result a thin oxide film is created on the base element's surface and does improve the insulating layer's adhesion.

Upon completion of pre-treatment, the heater layer is manufactured.

Preferably the insulation layer's initial material is a dispersion, in particular an electrically insulating thin film which is screen printed at uniform thickness on the base element surface. Preferably four individual strata are deposited consecutively, each stratum being dried separately. Once the desired layer thickness has been attained, the material feed tube together with the insulating layer shall be formed in an appropriate baking oven under atmospheric air at about 850° C., as a result of which a homogeneous glass-ceramic structure has been constituted.

In this procedure the baking temperature corresponds to that required to homogenize or solution anneal the base element. Both procedures—baking and solution annealing—therefore take place simultaneously.

On account of a specified mismatch between the linear thermal coefficient of expansion of the insulating layer and the linear thermal coefficient of expansion of the material feed tube, a mechanical precompression is generated in the insulation layer while it is being baked. The resulting stress-tolerant connection in the compound body already enables the insulation layer serving as support for the heater layer to withstand within certain limits the pulsating inner pressure loads in the material feed tube that are technically entailed by the injection molding procedure without cracks in or damages to the heater layer taking place.

After the base element together with the baked insulating layer has cooled to room temperature, first the electric terminals for the conducting resistance elements, and as called for, for a temperature sensor, are being mounted and dried. Starting at the electric terminals the mostly meandering or spiral resistance paths for the heater and also for the temperature sensor are deposited, using for this purpose—as well as for the electric terminals—electrically conducting pastes which are deposited, either by screen printing or using a dispenser, onto the insulating layer. Drying is always carried out after the individual strata have been deposited. All conductive layer elements thereupon are baked jointly and cooled to room temperature. In this process too, the base element again is solution annealed, though this step as yet does not permanently affect its structure.

The top coat also is an electrically insulating glass-ceramic which is screen printed on the resistance elements, on the electrical terminals and on the still freely exposed insulation layer in the partial zones, and then dried and thereafter being formed at approximately 750 to 900° C.

Following the last baking procedure, the base element together with the already deposited heater layer shall be heated again under a nitrogen atmosphere to about 525° C. and then is kept at this temperature for a defined time interval. Upon expiration of said interval, the compound body is cooled preferably at a cooling rate of −10° K/min.

The precipitation hardened steel shrinks during hardening at 525° C. by about 0.07% in all directions and when cooled again by about 11 ppm/° K, as a result of which the previously deposited and formed strata of the heater layer are compressed further. Accordingly precipitation hardening entails additional precompression and consequently the entire heater layer is able to permanently withstand even extreme temperature and inner pressure loads in the material feed tube. The hot duct nozzle is always optimally temperature controlled by means of the intimately bonded heater layer at every stage of the method of the invention.

The base element hardness attained after the hardening process is about 52 HRC.

Preferably the temperature sensor is situated in the same plane as the resistance paths of the heater. This sensor is integrated, as are the electrical terminals, into the heater layer. Said heater layer constitutes a compound layer, composed of several strata or stratum elements, which is undetachably joined to the base element and thus forms with latter a heated compound body.

In view of its high temperature coefficient of resistance TCR, the heater resistance itself may be used as a temperature sensor. For that purposes voltage taps from desired zones of the meandering or spiral resistance paths may be accessible from the outside. If the current is known, the detected partial voltage may indicate the temperature in such zones.

The present invention is not restricted to one of the above described embodiment modes, but instead it may be varied in many ways. For instance particular or all strata or layer elements of the heater layer also may be deposited by spraying or immersion. Alternatively sheets also may be used that shall be baked in the same manner as are the thick film pastes.

Also, the steel alloy of the base element may be a nickel-cobalt hot work steel. Appropriately and with respect to the baking or sintering of the heater layer, the steel must be suitable for peak temperatures up to 850 to 900° C. Furthermore this steel must be able to withstand operational temperatures up to 450° C. as well as internal pressure loads up to 2,000 bars.

It is understood that precipitation hardening steels may be used as the initial material for the steel element. Contrary to the case of the conventional hardening by means of carbon martensite, the above steels experience intermetallic precipitations that can be accurately controlled by means of alloy selection. The contraction taking place during hardening increases the compression stress in the insulating layer or in the entire heater layer and as a result substantially improves both service life and functional reliability.

Such features are beyond the reach of conventionally hardening steels unless the steel element be cooled at a critical rate. However the entailed high temperature and the high rate of cooling would destroy the heater layer: this eventuality is averted in simple and economical manner by the present invention.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single device, module, section, or other unit may fulfill the functions of several items recited in the claims.

The mere fact that certain measures are recited in mutually different dependent claims does not indicate that a combination of these measures cannot be used to advantage. Any reference signs in the claims should not be construed as limiting the scope.

What is claimed is:

1. An injection molding apparatus for manufacturing of moldable articles comprising:
   an injection manifold having at least one manifold input melt channel and a plurality of manifold output melt channels, the manifold being heated by at least one manifold heater controlled by at least one manifold thermocouple, which manifold thermocouple is associated with the manifold;
   a plurality of hot runner nozzles coupled to the manifold;
   a first nozzle heater and a first nozzle thermocouple secured to each hot runner nozzle;
   a plurality of mold cavities positioned to receive molten material from the plurality of hot runner nozzles, each mold cavity having at least one mold gate orifice having in particular a third axis, the mold cavity including a mold core and a mold cavity wall, where an outer surface of the mold core and the mold cavity wall define the mold cavity space that is formed in a mold closed position to receive molten material;
   a mold cavity heater surrounding each mold cavity or/and mold core at least partially;
   a thermocouple associated with the mold cavity to measure directly or indirectly a temperature generated by the mold cavity heater and/or by the mold core heater; and
   a controller linked to the first nozzle thermocouple and to the first nozzle heater and further linked to the mold cavity heater and to the mold cavity thermocouple, wherein an activation of the mold heater and a deactivation of the mold heater during an injection cycle or any change in the temperature provided by the mold cavity heater is performed individually between each mold cavity in correlation with quality information for each molded part as ejected from a corresponding mold cavity at an end of an each injection cycle and wherein the temperature of each nozzle heater can be further adjusted based on the temperature measured by the mold cavity thermocouple and or a thermocouple corresponding a mold core heater.

2. The injection molding apparatus according to claim 1, wherein the mold cavity heater is substantially coaxial with an axis of the mold core.

3. The injection molding apparatus according to claim 1, wherein the mold cavity heater includes a removable sleeve.

4. The injection molding apparatus according claim 3, wherein the mold cavity heater includes a heating element coupled to the sleeve.

5. The injection molding apparatus according to claim 1, wherein the mold cavity heater includes a connector.

6. The injection molding apparatus according to claim 1, wherein the apparatus is provided for side gating and the hot runner nozzles include at least one input melt channel portion having a first axis and at least one output melt channel portion having a second axis which is angled relative to the first axis.

7. The injection molding apparatus according to claim 6, wherein each of the hot runner nozzles includes a nozzle head portion, a nozzle body portion and a nozzle tip portion, the nozzles further including at least two nozzle tips and an associated nozzle tip seal.

8. The injection molding apparatus according to claim 1, wherein the mold cavities have a mold gate opening to receive and lock the nozzle tip seals.

9. The injection molding apparatus according to claim 1, wherein a second nozzle heater and a second nozzle thermocouple that are located at the lower end of the nozzle in the proximity of the mold gate.

10. The injection molding apparatus according to claim 1, wherein a valve pin and a valve pin driving mechanism in each nozzle to control the flow of molten material in the cavity.

11. The injection molding apparatus according to claim 1, wherein the mold heater is a film heater that comprises of the sleeve, a first electrical insulating layer deposited on the sleeve, an electrical element imprinted on the first electrical insulating material, a second electrical insulating material deposited on the electrical element.

12. The injection molding apparatus according to claim 1, wherein the heater sleeve is made of two semi-circular sleeves, each having a separate heating element and a corresponding thermocouple.

* * * * *